United States Patent Office 3,072,709
Patented Jan. 8, 1963

3,072,709
OCTAHYDRONAPHTHALENEONES, ALCOHOLS AND THEIR ACYL DERIVATIVES
Gabriel Saucy, Riehen, Switzerland, assignor to Hoffmann-La Roche Inc., Nutley, N.J., a corporation of New Jersey
No Drawing. Filed May 19, 1958, Ser. No. 736,407
Claims priority, application Switzerland May 21, 1957
12 Claims. (Cl. 260—476)

This invention relates to novel bicyclic compounds which can be derived from aldehydes represented by the following structural formula (I)
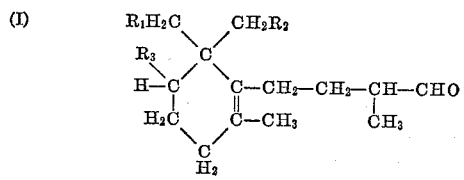

wherein $R_1$, $R_2$ and $R_3$ each represents hydrogen or lower alkyl
and to a method for the production of the bicyclic derivatives of said aldehydes.

According to one modification of this invention, an aldehyde corresponding to Formula I above may be cyclized by treatment with an acidic agent to obtain a bicyclic alcohol which can be represented by the following structural formula:

(II)
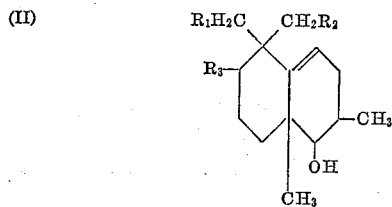

wherein $R_1$, $R_2$ and $R_3$ each represents hydrogen or lower alkyl.

Alcohols represented by Formula II may be produced from an aldehyde represented by Formula I by cyclizing the aldehyde with an acidic agent. These acidic agents include, particularly, strong mineral acids, such as phosphoric acid, concentrated sulfuric acid, concentrated hydrohalic acids, e.g. hydrobromic acid, or ansolvo acids, i.e. addition complexes of metal halides with water or alcohols which are strong proton acids, for example, boron trifluoride etherate. The conversion may be effected in an inert diluent, for example in an aromatic hydrocarbon, such as toluene, in dibutyl ether, in dioxane or in a chlorinated hydrocarbon, such as chloroform or trichloroethane. It is, however, more advantageous to work in the absence of a diluent.

In a preferred modification of the invention the aldehyde is admixed with phosphoric acid, e.g. 85%, at room temperature and the resulting condensation product is decomposed by means of alkali, e.g. alkali metal hydroxide, whereby the corresponding bicyclic alcohol having the Formula II results.

A second modification of this invention relates to esters which may be derived from aldehydes of Formula I by cyclizing the aldehyde with an organic acid or anhydride thereof or, alternatively, by esterifying an alcohol of Formula II by means of an acyl halide or acid anhydride.

These esters may be presented by the following structural formula:

(III)
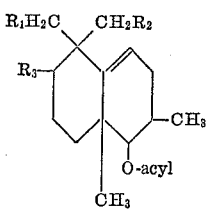

wherein $R_1$, $R_2$ and $R_3$ each represents hydrogen or lower alkyl.

The acyl groups in Formula III are acid groups derived, for example, from lower alkanoic acids, e.g. formic acid, acetic acid, propionic acid, etc., or aralkanoic acids, e.g. benzoic acid, etc.

If an organic acid or anhydride thereof is used to cyclize the aldehyde I, for example, formic acid or acetic anhydride, esterification of the hydroxyl group resulting from the reaction occurs simultaneously with the cyclization so that the product is an ester having the Formula III wherein the acyl group corresponds to the organic acid used. For example, by boiling the starting aldehyde with formic acid or acetic anhydride, the formate or acetate, respectively, is directly obtained.

Alternatively, the bicyclic alcohol having the Formula II may be esterified. The esterification may be accomplished, for example, by treating the alcohol with an acyl halide, such as acetyl chloride, benzoyl chloride, etc., or an acid anhydride, such as acetic anhydride, etc., in a basic medium, such as pyridine. The formates may be produced by permitting the alcohol to stand with anhydrous formic acid and acetic anhydride.

According to a further modification of this invention, the hydroxy group of the bicyclic alcohols of Formula II may be isomerized by oxidizing such alcohols, e.g. by means of chromic acid anhydride in glacial acetic acid, and reducing the keto compound thus formed, e.g. by means of lithium aluminium hydride in absolute ether.

According to another modification of this invention, alcohols represented by Formula II are hydrogenated, e.g. catalytically in the presence of a nobel metal catalyst such as palladium. There are thus obtained saturated, bicyclic alcohols which may be represented by the formula:

(IV)
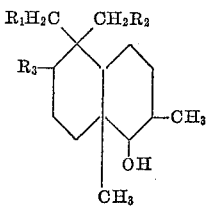

wherein $R_1$, $R_2$ and $R_3$ each represents hydrogen or lower alkyl.

The hydroxy group of the bicyclic alcohols of Formula IV may be isomerized by oxidizing such alcohols, e.g. by means of chromic acid anhydride in glacial acetic acid, and reducing the keto compound thus formed, e.g. by means of lithium aluminium hydride in absolute ether.

The bicyclic alcohols of Formula IV may be esterified in the same manner as the unsaturated alcohols of Formula II. The esters of the alcohols of Formula IV are also part of this invention.

Still another modification of this invention relates to saturated bicyclic ketones which are derived from the alcohols represented by Formula IV. These keto derivatives may be represented by the following structural formula:

(V) 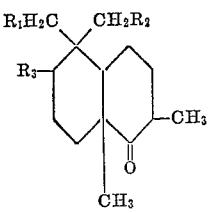

wherein $R_1$, $R_2$ and $R_3$ each represents hydrogen or lower alkyl.

The ketones of Formula V are produced by oxidizing alcohols having the Formula IV, e.g. by means of chromic acid anhydride in glacial acetic acid.

Unsaturated bicyclic ketones represented by the following structural formula:

(VI) 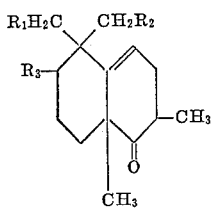

wherein $R_1$, $R_2$ and $R_3$ each represents hydrogen or lower alkyl form still another modification of the invention. These ketones are produced when alcohols having the Formula II are oxidized, for example, by treatment with chromic acid anhydride in glacial acetic acid.

The ketones having the Formula VI may be isomerized, effecting a shift in the double bond, e.g. by treatment with a strong mineral acid, such as sulfuric acid, to obtain isomeric bicyclic ketones which may be represented by the following structural formula:

(VII) 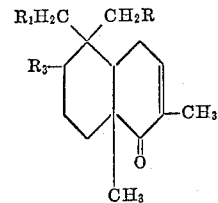

wherein $R_1$, $R_2$ and $R_3$ each represents hydrogen or lower alkyl.

The ketones represented by Formula VII form still another modification of this invention.

Illustrative aldehydes represented by Formula I which may be used as starting materials and which constitute a preferred group include the following:

4-(2,6,6-trimethyl-1-cyclohexen-1-yl)-2-methylbutan-1-al
4-(2,5,6,6-tetramethyl-1-cyclohexen-1-yl)-2-methylbutan-1-al
4-(2,6-dimethyl-6-ethyl-1-cyclohexen-1-yl)-2-methylbutan-1-al
4-(2,6-dimethyl-6-isobutyl-1-cyclohexen-1-yl)-2-methylbutan-1-al
4-(2-methyl-6,6-diethyl-1-cyclohexen-1-yl)-2-methylbutan-1-al The starting aldehydes I may be synthesized from the corresponding substituted β-ionone by a glycide ester synthesis and then partially hydrogenating the double bonds in the α,β-position to the aldehyde group.

The bicyclic saturated and unsaturated alcohols, esters and ketones obtained according to this invention are novel compounds which are aromatic in character and are useful in perfumery, for example as odorants in the compounding of perfumes or other scented compositions or as intermediates for preparing odorants for scented compositions.

The following examples are illustrative of the invention. All temperatures are expressed in degrees centigrade.

Example 1

100 g. 4-(2,6,6-trimethyl-1-cyclohexen-1-yl)-2-methyl-1-butanal were stirred with 100 ml. concentrated phosphoric acid. A red colored emulsion formed which heated up to about 50° in about 15 minutes and gradually became viscous. The reaction slowly died out after about 30 minutes whereby the reaction mixture became even more viscous and finally entirely solidified. The mixture was permitted to stand at room temperature for an additional 24 hours. 200 ml. of water were added and the solid reaction mass was pulverized with a spatula. The resulting slurry was filtered under suction and washed three times with 100 ml. portions of hot water. The solid granular residue was placed in a separatory funnel with 200 g. of crushed ice, 500 ml. of ether and 100 ml. of concentrated sodium hydroxide solution and was shaken until two clear layers resulted. The bottom layer was separated and the ether solution was washed in sequence with 200 ml. of dilute sodium hydroxide solution and three times with 200 ml. portions of water. The wash water was then extracted in two additional separatory funnels with 500 ml. portions of ether. The combined ether extracts yielded, after drying over sodium sulfate and concentrating under water vacuum at 60°, crude cyclization product in the form of a yellow colored oil, $n_D^{25}$ approximately 1.504. To crystallize the product, the crude material was dissolved in 200 ml. of low boiling petroleum ether and cooled for several hours with Dry Ice, whereby a voluminous, light yellow colored, crystalline precipitate resulted. This was filtered under suction, washed three times with 50 ml. portions of cold petroleum ether and dried under vacuum at room temperature. 2,5,5,9-tetramethyl-1-hydroxy-1,2,3,5,6,7,8,9-octahydronaphthalene was obtained in the form of white needles, M.P. 78–79°. By recrystallizing from petroleum ether, there was obtained a purer product, M.P. 79–80° (compact crystals), H activity=1.1.

Example 2

50 g. of 2,5,5,9-tetramethyl-1-hydroxy-1,2,3,5,6,7,8,9-octahydronaphthalene were permitted to stand for 24 hours at room temperature in 200 ml. of 100% formic acid to which had been added 27.5 g. acetic anhydride. The crude product was separated in the conventional manner by adding to water, extracting with ether and removing the ether. The crude material was then fractionated under high vacuum. The pure 2,5,5,9-tetramethyl-1-formoxy-1,2,3,5,6,7,8,9-octahydronaphthalene boiled at 95–96°/0.2 mm.; $n_D^{24}$=1.5010–1.5020.

Example 3

10 g. of 2,5,5,9-tetramethyl-1-hydroxy-1,2,3,5,6,7,8,9-octahydronaphthalene were permitted to stand in a mixture of 20 ml. pyridine and 10 ml. acetic anhydride for 24 hours at room temperature. The crude product was separated in the conventional manner by adding to water, extracting with ether and removing the ether. The crude material was then fractionated under high vacuum. The pure 2,5,5,9-tetramethyl-1-acetoxy-1,2,3,5,6,7,8,9-octahydronaphthalene boiled at 75°; $n_D^{23}$=1.4954.

Example 4

50 g. of 2,5,5,9-tetramethyl-1-hydroxy-1,2,3,5,6,7,8,9-octahydronaphthalene were dissolved in 100 ml. pyridine and treated with a mixture of 50 g. of benzoyl chloride and 50 ml. benzene over one hour while stirring. The reaction mixture was permitted to stand overnight. The crude product was extracted and washed in the conventional manner and then was crystallized in the cold from petroleum ether. The pure 2,5,5,9-tetramethyl-1-benzoyloxy-1,2,3,5,6,7,8,9-octahydronaphthalene was thus obtained as a white crystalline powder, M.P. 90–91°.

*Example 5*

30 g. of 4-(2,6,6-trimethyl-1-cyclohexen-1-yl)-2-methyl-1-butanal in 150 ml. of formic acid were refluxed for four hours. The crude 2,5,5,9-tetramethyl-1-formyloxy-1,2,3,5,6,7,8,9-octahydronaphthalene was worked up and purified as described in Example 2.

*Example 6*

20 g. of 4-(2,6,6-trimethyl-1-cyclohexen-1-yl)-2-methyl-1-butanal were dissolved in 50 ml. acetic anhydride and, after the addition of 0.4 g. p-toluenesulfonic acid, the solution was heated for three hours at 50°. The crude 2,5,5,9-tetramethyl-1-acetoxy-1,2,3,5,6,7,8,9-octahydronaphthalene was worked up and purified as described in Example 3.

*Example 7*

100 g. of 2,5,5,9-tetramethyl-1-hydroxy-1,2,3,5,6,7,8,9-octahydronaphthalene in 500 ml. glacial acetic acid were hydrogenated in the presence of 10 g. of 5% palladium-charcoal. After filtering off the catalyst and evaporating, the residue was crystallized from 200 ml. of high boiling petroleum ether. The 2,5,5,9-tetramethyl-1-hydroxy-decahydronaphthalene melted at 92–93°; H activity=1.01. The mother liquor, after evaporation, yielded a crystalline residue (M.P. 88–90°) which was purified by further crystallization.

*Example 8*

The hydrogenation solution resulting from the procedure described in Example 7 (comprising 100 g. 2,5,5,9-tetramethyl-1-hydroxy-decahydronaphthalene in 500 ml. of glacial acetic acid) was treated while stirring with a solution of 40 g. chromic acid anhydride in 80 cc. of water over the course of approximately two hours. Care was taken that the temperature in the reaction vessel did not exceed 40° by cooling with water. The reaction mixture was stirred for another hour at 40°. The residue was worked up in the conventional manner by diluting with water, extracting with petroleum ether, washing, drying and removing the solvent. The residue was then distilled under high vacuum. The pure 2,5,5,9-tetramethyl-1-keto-decahydronaphthalene boiled at 84°/0.04 mm.; $n_D^{20}=1.4930$.

*Example 9*

100 g. of 2,5,5,9-tetramethyl-1-hydroxy-1,2,3,5,6,7,8,9-octahydronaphthalene were oxidized as described in Example 8. The 2,5,9-tetramethyl-1-keto-1,2,3,5,6,7,8,9-octahydronaphthalene obtained was purified by chromatography, B.P.$_{0.1}$=90°; $n_D^{23}=1.5027$.

*Example 10*

70 g. of the ketone obtained in Example 9 were dropped into 140 ml. of concentrated sulfuric acid over the course of one hour while stirring. The reaction mixture was then warmed at 50° for another two hours, poured onto ice and then worked up in the conventional manner by extracting and washing. The 2,5,5,9-tetramethyl-1-keto-1,4,5,6,7,8,9,10-octahydronaphthalene was distilled under high vacuum and purified by crystallizing from petroleum ether while cold, M.P. 38–39°. The ketone, in petroleum ether solution, has a U.V. absorption spectrum maximum at 236 m$\mu$, $E_1^1=666$.

*Example 11*

10 g. of the α,β-unsaturated ketone obtained in Example 10 were dissolved in 100 ml. methanol and hydrogenated in the presence of palladium-calcium carbonate catalyst. The 2,5,5,9-tetramethyl-1-keto-decahydronaphthalene thus obtained was worked up in the conventional manner by diluting with water, extracting with petroleum ether, washing, drying and removing the solvent. The product was crystallized from a methanol-water mixture, M.P. 48–49°. The compound is an isomer of the ketone obtained in Example 8.

*Example 12*

To a solution of 8 g. of lithium aluminum hydride in 200 ml. absolute ether were added over one hour, while stirring, a solution of 80 g. of 2,5,5,9-tetramethyl-1-keto-decahydronaphthalene (obtained as described in Example 8). The reaction mixture was then refluxed for one hour. The crude product was worked up in the conventional manner by separating the catalyst and concentrating. After distilling the residue under high vacuum, there was obtained pure 2,5,5,9-tetramethyl-1-hydroxy-decahydronaphthalene; B.P.$_{0.07}$=95°; $n_D^{23}=1.5030$. The compound is an isomer of the alcohol obtained in Example 7.

I claim:
1. A method for producing bicyclic compounds of the formula

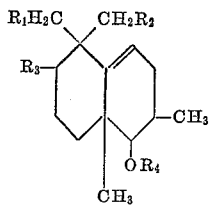

wherein $R_1$, $R_2$ and $R_3$ each is a member of the group consisting of hydrogen and lower alkyl and $R_4$ is a member of the group consisting of hydrogen and lower alkanoyl, which comprises cyclizing an aldehyde of the structural formula

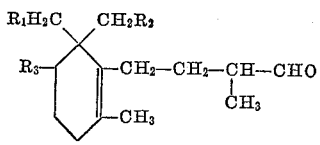

wherein $R_1$, $R_2$ and $R_3$ are the same as above, by reaction with a member of the group consisting of mineral acids, ansolvo acids, lower alkanoic acids and lower alkanoic acid anhydrides.

2. A method for producing 2,5,5,9-tetramethyl-1-hydroxy-1,2,3,5,6,7,8,9-octahydronaphthalene which comprises reacting 4-(2,6,6-trimethyl-1-cyclohexen-1-yl)-2-methyl-1-butanal with phosphoric acid.

3. A method for producing 2,5,5,9-tetramethyl-1-lower alkanoyloxy-1,2,3,5,6,7,8,9-octahydronaphthalene which comprises reacting 4-(2,6,6-trimethyl-1-cyclohexen-1-yl)-2-methyl-1-butanal with a lower alkanoic acid.

4. A method for producing 2,5,5,9-tetramethyl-1-formyloxy-1,2,3,5,6,7,8,9-octahydronaphthalene which comprises reacting 4-(2,6,6-trimethyl-1-cyclohexen-1-yl)-2-methyl-1-butanal with formic acid.

5. A compound of the structural formula

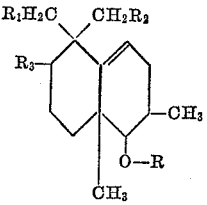

wherein $R_1$, $R_2$ and $R_3$ each is a member of the group consisting of hydrogen and lower alkyl and R is a member of the group consisting of lower alkanoyl and benzoyl.

6. 2,5,5,9-tetramethyl-1-formyloxy-1,2,3,5,6,7,8,9-octahydronaphthalene.

7. 2,5,5,9-tetramethyl-1-acetoxy-1,2,3,5,6,7,8,9 - octahydronaphthalene.

8. 2,5,5,9-tetramethyl-1-benzoyloxy - 1,2,3,5,6,7,8,9-octahydronaphthalene.

9. A compound of the structural formula

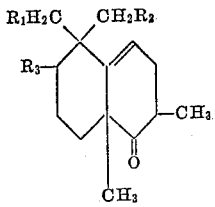

where $R_1$, $R_2$ and $R_3$ each is a member of the group consisting of hydrogen and lower alkyl.

10. 2,5,5,9-tetramethyl-1-keto-1,2,3,5,6,7,8,9 - octahydronaphthalene.

11. A compound of the structural formula

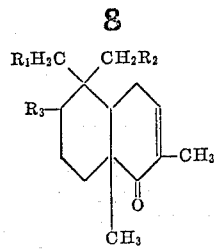

wherein $R_1$, $R_2$ and $R_3$ each is a member of the group consisting of hydrogen and lower alkyl.

12. 2,5,5,9-tetramethyl-1-keto-1,4,5,6,7,8,9,10 - octahydronaphthalene.

References Cited in the file of this patent

UNITED STATES PATENTS

| | | |
|---|---|---|
| 2,802,880 | Stoll et al. | Aug. 13, 1957 |
| 2,809,996 | Stoll | Oct. 15, 1957 |
| 2,912,462 | Goldstein et al. | Nov. 10, 1959 |

OTHER REFERENCES

Ruegg et al.: Helv. Chim. Acta., 33, 889–890, 895–6 (1950).

Cocker et al.: Chem. & Ind., pp. 1275–6 (1956).

UNITED STATES PATENT OFFICE
CERTIFICATE OF CORRECTION

Patent No. 3,072,709 January 8, 1963

Gabriel Saucy

It is hereby certified that error appears in the above numbered patent requiring correction and that the said Letters Patent should read as corrected below.

Column 2, line 44, for "nobel" read -- noble --; column 5, line 52, for "2,5,9" read -- 2,5,5,9 --; column 7, line 16, for "where" read -- wherein --.

Signed and sealed this 29th day of October 1963.

(SEAL)
Attest:

ERNEST W. SWIDER
Attesting Officer

EDWIN L. REYNOLDS
Acting Commissioner of Patents